(12) United States Patent
Corley et al.

(10) Patent No.: US 9,088,634 B1
(45) Date of Patent: Jul. 21, 2015

(54) DYNAMIC MEDIA TRANSCODING AT NETWORK EDGE

(75) Inventors: Jonathan B. Corley, Seattle, WA (US); Tal Saraf, Seattle, WA (US); Bradley E. Marshall, Bainbridge Island, WA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 590 days.

(21) Appl. No.: 13/465,931

(22) Filed: May 7, 2012

(51) Int. Cl.
G06F 15/16 (2006.01)
H04L 29/06 (2006.01)
H04N 19/40 (2014.01)

(52) U.S. Cl.
CPC .............. *H04L 65/605* (2013.01); *H04N 19/40* (2014.11)

(58) Field of Classification Search
CPC .......................... H04L 65/605; H04L 29/08729
USPC .......................................................... 709/219
See application file for complete search history.

(56) References Cited

U.S. PATENT DOCUMENTS

| | | | |
|---|---|---|---|
| 5,541,852 A | 7/1996 | Eyuboglu et al. | |
| 6,732,332 B1 | 5/2004 | Borysewcz et al. | |
| 6,970,602 B1* | 11/2005 | Smith et al. | 382/232 |
| 7,761,900 B2 | 7/2010 | Crayford | |
| 8,634,705 B2 | 1/2014 | Yogeshwar et al. | |
| 2002/0150247 A1 | 10/2002 | Linnartz et al. | |
| 2002/0170035 A1 | 11/2002 | Casati et al. | |
| 2006/0168630 A1 | 7/2006 | Davies | |
| 2007/0157260 A1 | 7/2007 | Walker | |
| 2007/0162945 A1 | 7/2007 | Mills | |
| 2007/0174338 A1 | 7/2007 | Liggett | |
| 2008/0034393 A1 | 2/2008 | Crayford | |
| 2008/0205510 A1 | 8/2008 | Komi et al. | |
| 2008/0301588 A1 | 12/2008 | Kumar et al. | |
| 2009/0083279 A1 | 3/2009 | Hasek | |
| 2009/0254672 A1 | 10/2009 | Zhang | |
| 2009/0276266 A1 | 11/2009 | Nishiyama | |
| 2010/0017516 A1* | 1/2010 | Sparrell et al. | 709/226 |
| 2010/0054148 A1 | 3/2010 | Murakami et al. | |
| 2010/0076805 A1 | 3/2010 | Batsakis et al. | |
| 2010/0088505 A1 | 4/2010 | Coppola et al. | |
| 2010/0199299 A1 | 8/2010 | Chang et al. | |
| 2010/0205616 A1 | 8/2010 | Lai et al. | |

(Continued)

OTHER PUBLICATIONS

U.S. Appl. No. 61/527,485.*

(Continued)

*Primary Examiner* — June Sison
(74) *Attorney, Agent, or Firm* — Novak Druce Connolly Bove + Quigg LLP

(57) ABSTRACT

A set of transcoding techniques are described for encoding media content on the fly based on device requesting the content. A copy of media content (video or audio file) is stored at a content delivery network (CDN) point-of-presence (POP) server or some other network edge server device. When a device requests the content, the CDN POP server determines the type of device based on the information contained in the request and transcodes the content on-the-fly into the correct encoding for that particular type of device when providing the content to the device. For example, if the requesting device is recognized to be a mobile phone having a particular operating system, the edge server can transcode the media content into the format suitable to display at the mobile phone using that particular operating system. The transcoding can be performed dynamically at the time of transmitting the content to the device.

22 Claims, 5 Drawing Sheets

(56) References Cited

U.S. PATENT DOCUMENTS

| | | |
|---|---|---|
| 2010/0250710 A1 | 9/2010 | Cadwell et al. |
| 2010/0281042 A1 | 11/2010 | Windes et al. |
| 2010/0309794 A1 | 12/2010 | Keynan et al. |
| 2010/0332262 A1 | 12/2010 | Horvitz et al. |
| 2011/0019870 A1 | 1/2011 | Ballocca et al. |
| 2011/0082982 A1 | 4/2011 | Harvell et al. |
| 2011/0088076 A1* | 4/2011 | Li et al. ............ 725/114 |
| 2011/0153628 A1 | 6/2011 | Basu et al. |
| 2011/0197221 A1 | 8/2011 | Rouse et al. |
| 2011/0209162 A1 | 8/2011 | Machiraju et al. |
| 2011/0313982 A1 | 12/2011 | Kranendonk et al. |
| 2011/0314093 A1 | 12/2011 | Sheu |
| 2012/0072542 A1 | 3/2012 | McGowan |
| 2012/0089687 A1 | 4/2012 | Katz |
| 2012/0102154 A1 | 4/2012 | Huang et al. |
| 2012/0158645 A1 | 6/2012 | Shafiee et al. |
| 2012/0159494 A1 | 6/2012 | Shafiee et al. |
| 2012/0159503 A1 | 6/2012 | Shafiee et al. |
| 2012/0192239 A1 | 7/2012 | Harwell et al. |
| 2012/0209942 A1* | 8/2012 | Zehavi et al. ............ 709/213 |
| 2012/0236201 A1* | 9/2012 | Larsen et al. ............ 348/468 |
| 2012/0254456 A1* | 10/2012 | Visharam et al. ............ 709/231 |
| 2012/0265847 A1* | 10/2012 | Swenson et al. ............ 709/217 |
| 2012/0278441 A1 | 11/2012 | Li et al. |
| 2013/0019311 A1 | 1/2013 | Swildens |
| 2013/0054827 A1* | 2/2013 | Feher et al. ............ 709/231 |

OTHER PUBLICATIONS

U.S. Appl. No. 61/562,377.*
Non-Final Office Action issued in U.S. Appl. No. 13/465,944 dated Sep. 24, 2014, 23 pages.
Final Office Action issued in U.S. Appl. No. 13/465,975 dated Sep. 11, 2014, 48 pages.
Non-Final Office Action issued in U.S. Appl. No. 13/465,975 dated Feb. 4, 2014, 32 pages.
Final Office Action issued in U.S. Appl. No. 13/465,978 dated Jul. 3, 2014, 26 pages.
Non-Final Office Action issued in U.S. Appl. No. 13/465,978 dated Feb. 4, 2014, 23 pages.
Non-Final Office Action issued in U.S. Appl. No. 13/465,987 dated Apr. 2, 2013, 9 pages.
Final Office Action issued in U.S. Appl. No. 13/465,987 dated Oct. 24, 2013, 10 pages.
Non-Final Office Action issued in U.S. Appl. No. 13/465,992 dated Jul. 29, 2014, 32 pages.
Non-Final Office Action issued in U.S. Appl. No. 13/465,997 dated May 1, 2014, 12 pages.
Non-Final Office Action issued in U.S. Appl. No. 13/465,997 dated Oct. 21, 2014, 14 pages.
Non-Final Office Action issued in U.S. Appl. No. 13/466,002 dated Sep. 23, 2014, 12 pages.
Non-Final Office Action issued in related U.S. Appl. No. 13/466,002 dated Jan. 3, 2013 (11 pages).
Final Office Action issued in related U.S. Appl. No. 13/466,002 dated Jul. 19, 2013 (12 pages).
Final Office Action issued in U.S. Appl. No. 13/465,944 dated Feb. 20, 2015, 24 pages.
Non-Final Office Action issued in U.S. Appl. No. 13/465,975 dated Jan. 16, 2015, 38 pages.
Non-Final Office Action issued in U.S. Appl. No. 13/465,978 dated Jan. 29, 2015, 18 pages.
Final Office Action issued in U.S. Appl. No. 13/465,992 dated Feb. 23, 2015, 27 pages.
Notice of Allowance issued in U.S. Appl. No. 13/465,997 dated Feb. 4, 2015, 7 pages.
"API", Newton's Telecom Dictionary, 18th ed., Feb. 2002, p. 71.

* cited by examiner

DYNAMIC MEDIA TRANSCODING AT NETWORK EDGE

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Transcoding is the decoding and recoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported.

A content delivery network (CDN) is an interconnected network of computer nodes that contain copies of various types of data. Using a CDN can improve access to the data cached at the nodes by increasing access bandwidth/redundancy and reducing access latency. CDNs are often used to provide access to media content.

BRIEF DESCRIPTION OF THE DRAWINGS

Various embodiments in accordance with the present disclosure will be described with reference to the drawings, in which.

DETAILED DESCRIPTION

Figure 1:
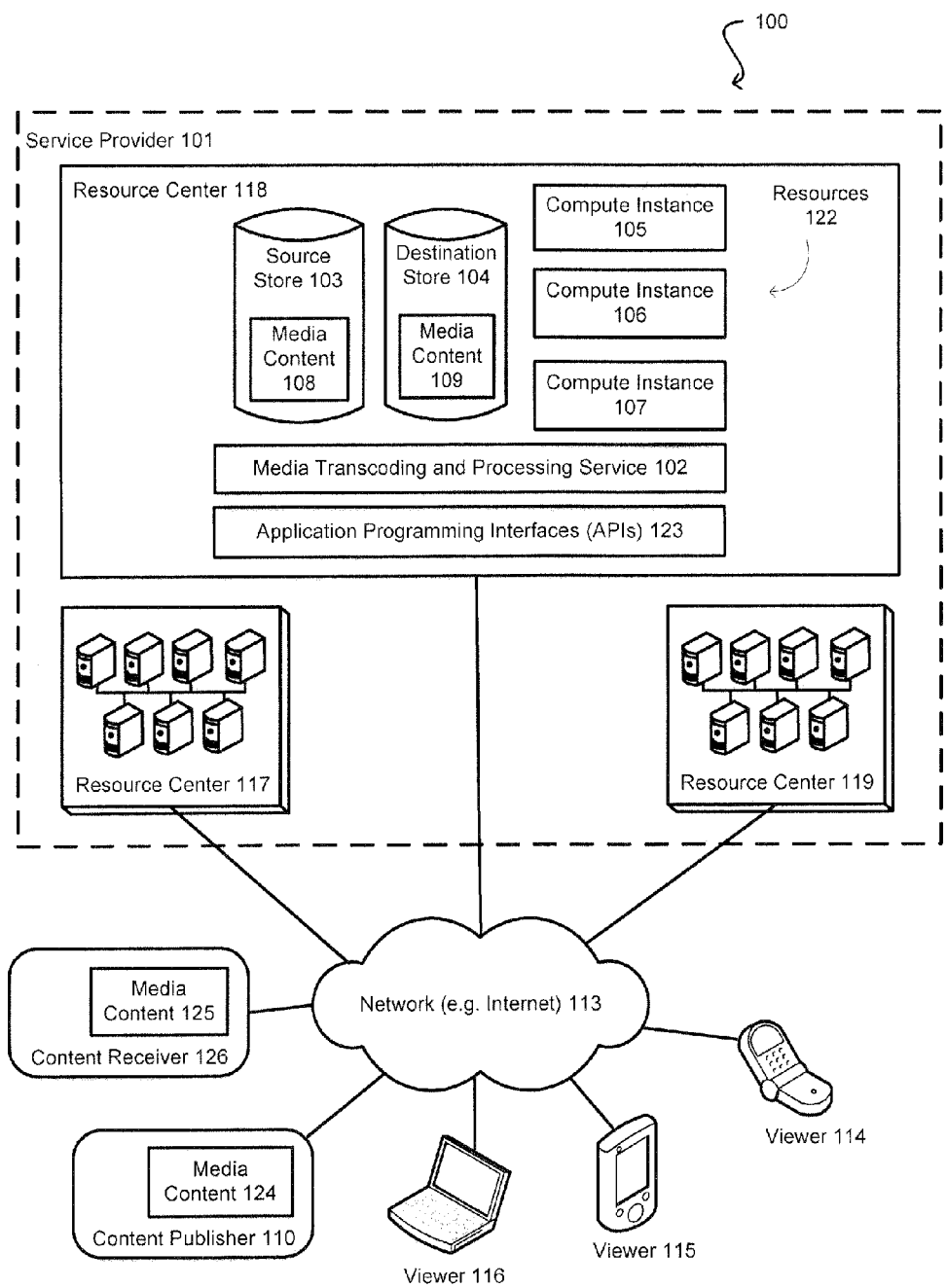
FIG. 1 is a general illustration of an environment in which the transcoding service can be utilized, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for transcoding content. In particular, various embodiments provide approaches for dynamically transcoding media at the network edge based on the type of the device requesting the content.

In accordance with various embodiments, a transcoding system or service is described for encoding media content on-the-fly based at least in part on the device requesting the content. A copy of media content (e.g. an audio, video, or multimedia file) can be stored at a location such as a server located at the network edge (e.g. content delivery network (CDN) point-of-presence (POP)). When a device requests the media content, a component such as an edge server located at the POP inspects the request and determines the type of requesting device based on information associated with the request (e.g. hypertext transfer protocol (HTTP) headers of the request, parameters associated with the request, metadata associated with the request, or any other information contained in the request). Alternatively, the edge server may determine the type of operating system (OS), browser or application that is associated with the request, wherein that OS, browser or application may have a particular encoding format that it can use to render the media content.

Once the request has been inspected, the edge server can transcode the content on-the-fly into the appropriate encoding for the particular device type (or OS, application, or browser type) before delivering a copy of the requested media to the device. For example, if the requesting device is recognized to be an iPhone®, the edge server may transcode the media file into a format suitable for display on the iPhone®, as least as determined approximately at the time in which the content is to be transmitted to the device. In some embodiments, the transcoding can be performed at the time when the content is being transmitted to the device in response to the request. For example, the edge server may be transcoding the media content while bits of the transcoded content is concurrently being transmitted to the device. In various embodiments, the edge server can be a cache server at the POP, a dedicated transcoding server, or any other device capable of transcoding media that resides at the network edge location, such as the POP.

FIG. 1 is a general example of an environment 100 in which the transcoding and other processing of media content can be implemented, in accordance with various embodiments. As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 2:
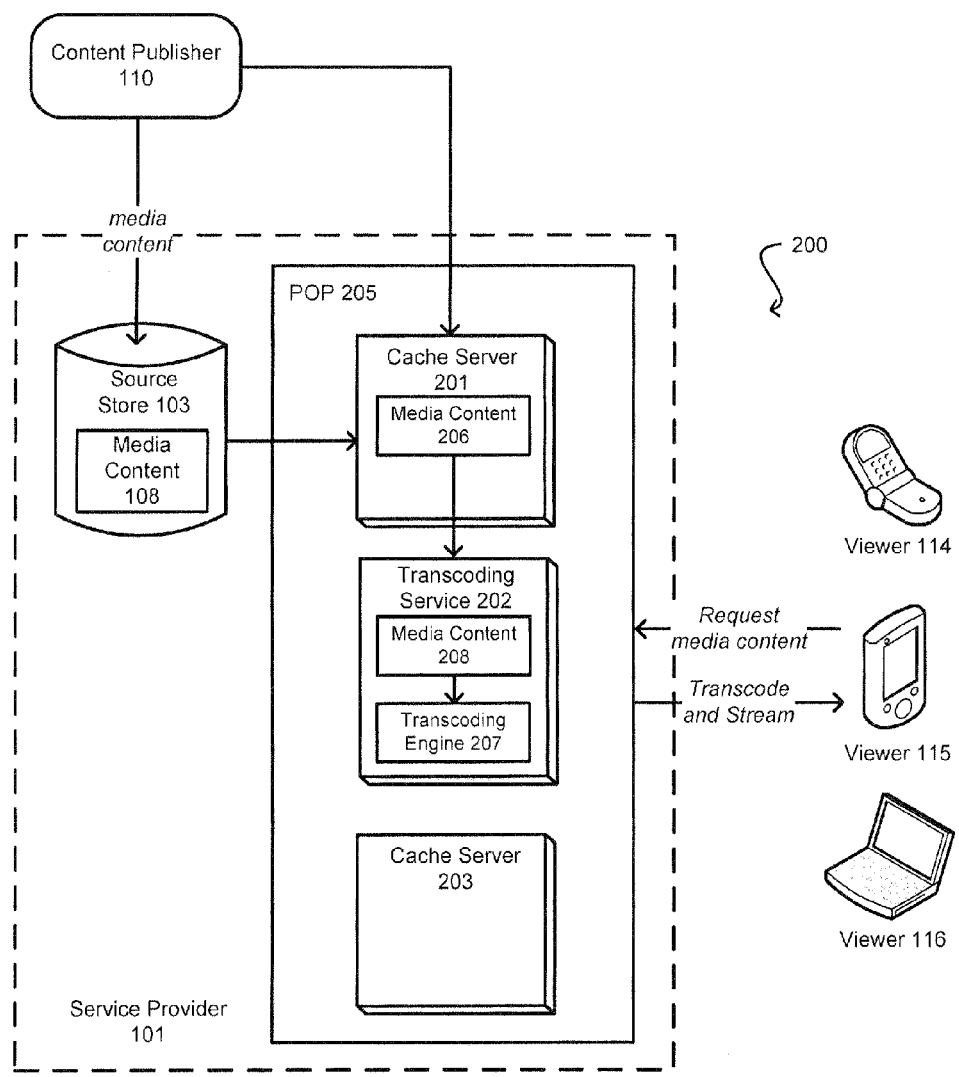
FIG. 2 is an example of a network edge environment where media content can be dynamically transcoded based at least in part upon on requesting device type, in accordance with various embodiments.

FIG. 2 is an example of a network edge environment 200 where media content can be dynamically transcoded based at least in part upon on requesting device type, in accordance with various embodiments. It should be understood that reference numbers for like components may be carried over between figures for purposes of explanation, but this should not be interpreted as limiting the scope of the various embodiments.

As previously described, a content publisher 110 can provide the media content 108 to the source store 103 or some other storage location provided by the service provider 101. The service provider can then transfer the media content to a cache server 201 (or another server) residing at the network edge location, such as a content delivery network (CDN) point of presence (POP) 205. The transfer may make access to the media more efficient for users proximate to the POP. In an alternative embodiment, the content publisher 110 may provide the media content 108 directly to the POP 205 from a location on the content publisher 110. As previously mentioned, the CDN of the service provider may include a plurality of POPs (such as POP 205) which may be geographically distributed to various locations that are proximate to the end users and devices. Several POPs can use the same internet protocol (IP) address and the routing scheme can be utilized that to find a POP that is the closest to an end user in terms of network hops required to reach it. It should be noted that while the source store 103 is shown as being located outside of POP 205 in FIG. 2, this is not intended to be a limitation to the various embodiments described herein. In some embodiments, the source store may be located at the same POP 205 and therefore may not need to be transferred. In other embodiments, the source store 103 may be located at another POP (or other resource center) and the transfer of the media content from the source store 103 to the POP 205 may occur in response to receiving the request for the media content at POP 205. Alternatively, the transfer of the media content from the source store 103 to POP 205 may be performed automatically upon placement of the media content into the source store.

In accordance with the illustrated embodiment, POP 205 can include a number of cache servers (201, 203) capable of storing a copy of the media content 206 locally to be made available to the various requesting devices. In addition, the POP 205 may include a transcoding service 202. When a viewer device (e.g. device 115) requests the media content from the POP 205, the request can be inspected to determine a device type (and other information such as application-type, OS-type, browser-type, etc.) associated with the requesting viewer based on information contained in the request. For example, based on the HTTP header information contained in the request, it may be determined that the device 115 requesting the media file is an Apple® iPhone® running a particular version of the Apple® IOS operating system. In accordance with various embodiments, each device type can be associated with a particular type of encoding format that is suitable to display or render the media file on that device (based on the OS, application, display resolution, settings, etc.). In addition, a profile may be associated with the device type and may contain all of the processing settings and parameters necessary to transcode the media content into the format appropriate for the device. In various embodiments, a variety of information contained in the request can be used to select the type of format for transcoding the media content. For example, request parameters, uniform resource locator (URL) of the request, request metadata, or any other data embedded in the request or received along with the request may be used in this determination.

In accordance with an embodiment, once the type of device requesting the content is identified, the POP 205 can make a determination whether the copy 206 of the media content is in the appropriate format for being displayed on the requesting device 115. If the media content is already in the appropriate format, the cache server 201 can simply provide the cached copy to the requesting device 115. If on the other hand, the media file is not in the correct format to be displayed on the requesting device 115, the cache server 201 can provide the media content to the transcoding server 202 having a transcoding engine 207 to perform dynamic transcoding of the media content 208. In accordance with an embodiment, the transcoding service may transcode the media content based at least in part on the device type and various performance characteristics associated with the device. For example, once the device type is identified, the appropriate settings and parameters for transcoding the media may be selected based on the screen/display capabilities of the requesting device, which version of the operating system the device is running, the processing capacity of the device, available memory on the device and the like.

In accordance with an embodiment, the transcoding service 202 can utilize a graphics processing unit (GPU) configuration to transcode the media content 208 in an optimal performance manner. For example, the transcoding server 202 can use the compute unified device architecture (CUDA) as the computing engine in the GPU to encode the video content into the appropriate format for the requesting device. It should be noted that as previously mentioned, the term "transcoding" is not necessarily limited to changing the format of the media content, but may also include performing such functions as transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. For example, if a requesting device is not able to handle a certain quality video stream, or a certain data transfer rate, the transcoding server 202 may adjust the quality of the video stream or the data transfer rate to accommodate the device.

In accordance with an embodiment, the transcoding server 202 can transcode the media content 208 on-the-fly into the correct encoding format when responding to the request by transmitting bits of the media content to device 115. For example, the transcoding server 202 can stream the bits that have been encoded into the proper format to the device, while the transcoding engine 207 is transcoding the remaining bits of the media file. In accordance with one embodiment, the POP 205 can utilize an initial burst mode to stream the beginning portion of the media file transcoded at one bit rate and then complete the remaining portion of the media file at a different bit rate. This can help avoid any latency on the part of the requesting device that may be viewing the media content as it is being transcoded and streamed to it.

In accordance with an embodiment, if the transcoding service 202 detects that the requesting device 115 has ceased downloading the media, the dynamic transcoding can be terminated in order to save the computing resources of the POP 205. For example, if the user stops viewing the video file, the transcoding server can halt the transcoding process and apply the GPU resource to other transcoding jobs that may be needed.

In some embodiments, the transcoding service 202 may select and perform the transcoding based at least in part on various network conditions, such as bandwidth, jitter, packets lost or the like. For example, if the network bandwidth is low due to high amounts of traffic/data, the transcoding service 202 may opt to transcode the media content at a lower bit rate or lower resolution in order to deliver the media content more efficiently to the requesting device.

Figure 3:
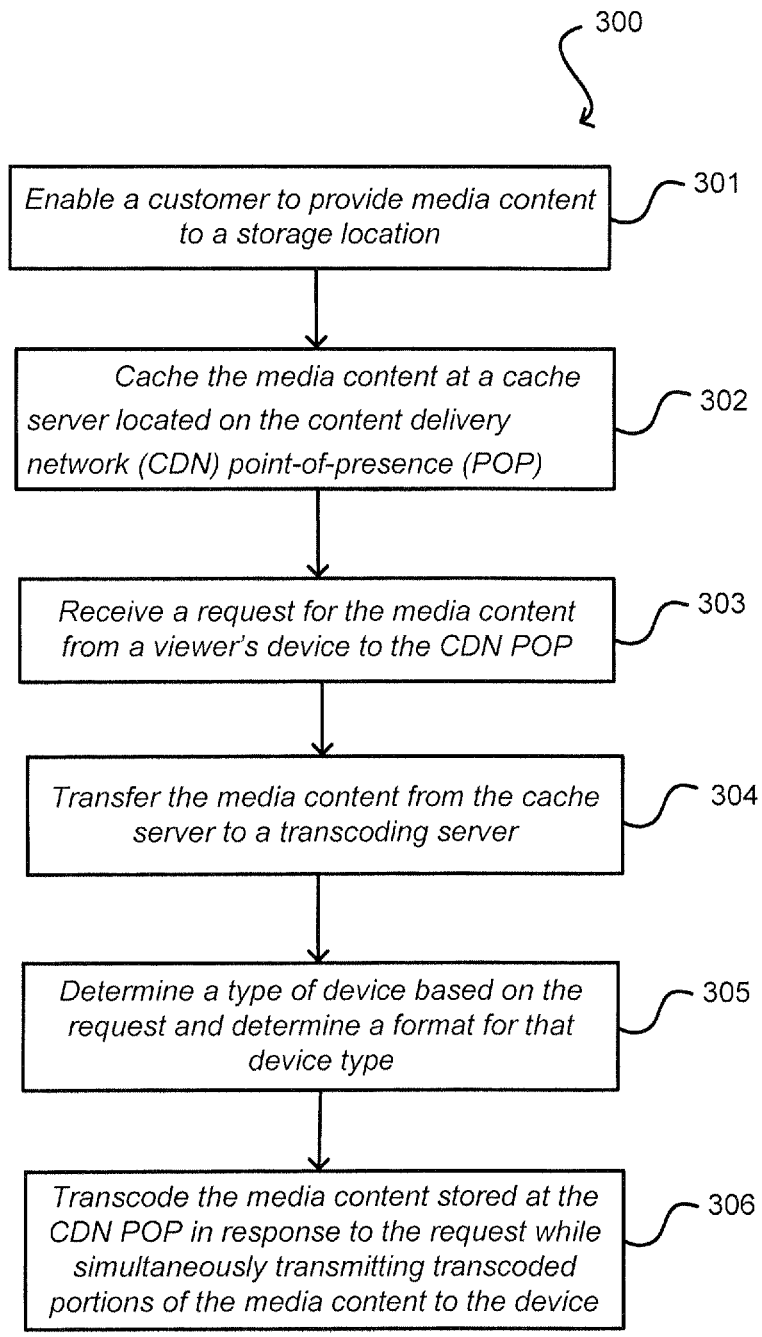
FIG. 3 illustrates an example process for dynamic encoding of media at the network edge based on device type, in accordance with various embodiments.

FIG. 3 illustrates an example process 300 for dynamic encoding of media at the network edge based on device type, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in operation 301, the service provider can enable a customer to provide media content to an input store, as described in connection with FIG. 1. For example, the service provider can expose APIs or provide a graphical interface for the content owners and content publishers to upload their media content to an input store on one of the servers maintained by the service provider. The media content file that is uploaded may be in a particular encoding format, such as MPEG2 for example.

In operation 302, once the media content has been uploaded to the input store (or some other storage location) by the content publisher, the media content can be optionally cached at the various content delivery network POPs. In some embodiments, the caching of the media content can be performed automatically upon receiving the file, or at a time that the media is requested and provided to users at the various POPs. In other embodiments, the media content is not cached at a cache server.

In operation 303, the network edge (e.g. POP) can receive a request for the media content from a requesting device. For example, the request can be received from a viewer on a mobile phone wanting to stream and view the video content, or may be requested from a personal computer (PC) utilizing a web browser, or any other approach utilized by the various viewers. In accordance with an embodiment, the request can be an HTTP request, including one or more HTTP headers that define the operating parameters of the transaction. In various embodiments, the network edge can be any resource center that may include data centers, server farms, CDN POPs, or the like.

In operation 304, the media content may be transferred from a cache server to a transcoding server at the POP. This may be performed in response to receiving the request for the media content or alternatively, may be performed prior to receiving the request.

In operation 305, the POP determines a device type associated with the requesting device based on the information contained in the request. For example, the HTTP headers typically contain some information about the device type that has initiated the HTTP request. The POP (e.g. transcoding server at the POP) can inspect this information and determine the device type based on the HTTP headers. In accordance with an embodiment, the device type can be associated with a particular encoding format that can be used to render the media content on that device. The transcoding system can include a number of profiles associated with various devices, where the profiles indicate which encoding format is suitable for each device type (or its operating system). The POP can utilize these profiles to determine which form of encoding to perform on the media content for the requesting device. In accordance with alternative embodiments, the requesting device can indicate in the request which particular encoding format the device would like to receive the media content in.

In operation 306, the transcoding server can transcode the media content cached at the POP in response to the request. In accordance with an embodiment, the server can transcode the media content from one encoding format to another while simultaneously streaming the encoded bits to the device. In this manner, the transcoding can be performed on-the-fly, eliminating the need to pre-transcode each media file into all the formats that are desired to be supported and thereby reducing the storage footprint and increasing the number of devices supported by the transcoding service.

Figure 4:
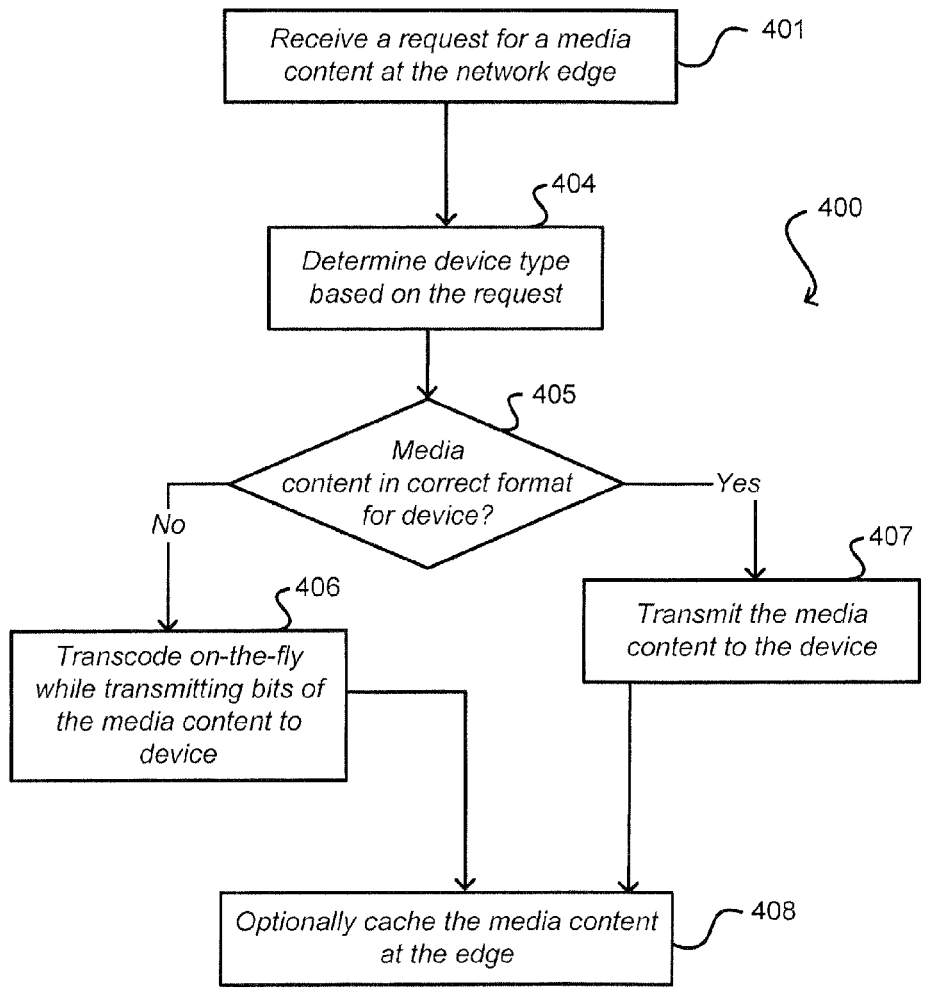
FIG. 4 is an example logical process performed by the network edge server to dynamically transcode media at the edge, in accordance with various embodiments.

FIG. 4 is an example logical process 400 performed by the network edge server to dynamically transcode media at the edge, in accordance with various embodiments. As shown in operation 401, the network edge server (e.g. a server at the CDN POP) may receive a request for media content. Upon receiving the request for the media content at the edge, the edge server (e.g. transcoding server) determines the device type based on the information contained in the request, as shown in step 404. As previously mentioned, each device type or device software type may be associated with its own encoding format and this information may be available to the network edge. In some embodiments, if the media content is not available at the network edge, the edge server may retrieve (or receive) the content from another location, such as the input store residing in a remotely located resource center.

In step 405, the network edge server determines whether the cached copy of the media content is in the appropriate format for the device type. If the media content is already in the correct format, the edge server can simply transmit the media content to the device to satisfy the request, as shown in step 407. If, on the other hand, the media content is not in an encoding that is suitable for the requesting device, the edge server can perform transcoding on-the-fly while simultaneously transmitting encoded bits to the device, as shown in step 406. For example, the edge server can perform MPEG2 to H.264 transcoding while at the same time streaming video content of the media file to the requesting device. It should be noted that in alternative embodiments, the media content need not be transcoded while it is being streamed to the device, but can instead be transcoded first and then provided to the device, or delivered in segments that have been transcoded and the like.

Once the transcoding is complete, the edge server can optionally cache the media content locally to satisfy any potential future requests, as shown in step 408. In accordance with various embodiments, the media content can be cached in the original encoding format, the format into which it was just transcoded, or in both encoding formats.

Figure 5:
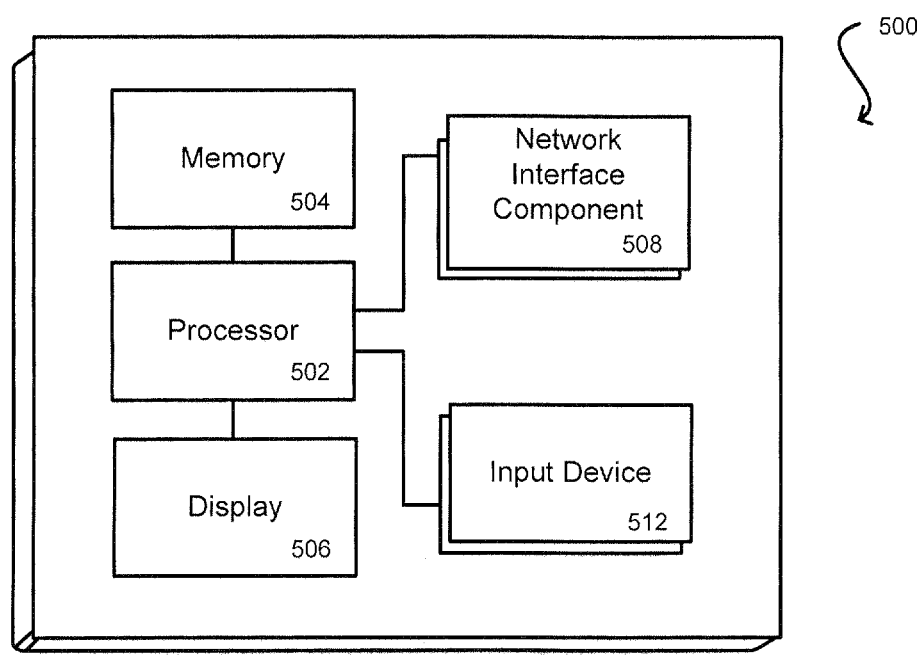
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perk Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for dynamic transcoding of media at the network edge, said method comprising:
   under the control of one or more computer systems configured with executable instructions,
   enabling a customer to provide media content to an input store of a service provider, at least a portion of the media content being encoded using a first media format;

storing a copy of the media content at a server residing in a content delivery network (CDN) point-of-presence (POP);

receiving a request for the media content from a client device to the server in the CDN POP;

inspecting the request and determining a device type associated with the client device based at least in part on information contained in the request, the device type being associated with a second media format;

transcoding at least a portion of the media content at the server in the CDN POP from the first media format into the second media format and applying a watermark to the media content, the transcoding having access to one or more workflows, the one or more workflows including a first workflow for applying the watermark and a separate second workflow for at least one of providing multi-bitrate or adding audio to the media content;

transmitting, to the client device, the media content that has been transcoded into the second media format;

causing an access control to be applied to the media content based at least upon the watermark applied to the media content;

determining that the client device has discontinued downloading the media content; and terminating the transcoding or downloading at the CDN POP.

2. The method of claim 1, wherein storing the media content in the CDN POP further comprises:

transferring the media content from the input store to the server at the CDN POP in response to having received a request for the media content to the CDN POP from the client device; and caching a copy of the media content at a cache server in the CDN POP to satisfy future requests for the media content.

3. The method of claim 1, wherein transcoding the media content at the server CDN POP further includes:

employing at least one graphics processing unit (GPU) to transcode the at least a portion of the media content into the second media format while concurrently transmitting the at least a portion of the media content that have been transcoded into the second media format to the client device.

4. The method of claim 1, wherein the server at the CDN POP stores one or more profiles for a plurality of device types, the profiles indicating a media format for each of the plurality of device types supported by the transcoding server.

5. A computer implemented method, comprising:

under the control of one or more computer systems configured with executable instructions, receiving a request for media content, the request originating at a device, the media content being stored at a network edge server, the request containing information;

determining, on the network edge server, a format suitable for rendering the media content on the device, the format being determined based at least in part on the information contained in the request;

transcoding at least a portion of the media content stored at the network edge server into the format suitable for rendering the media content on the device and applying a watermark to the media content, the transcoding having access to one or more workflows, the one or more workflows including a first workflow for applying the watermark and a separate second workflow for at least one of providing multi-bitrate or adding audio to the media content;

transmitting, to the device, a copy of the media content that has been transcoded into the format; causing an access control to be applied to the media content based at least upon the watermark applied to the media content;

determining that the device has discontinued downloading the media content; and terminating the transcoding or downloading at the network edge server.

6. The method of claim 5, further comprising:

enabling a publisher to upload the media content to a store located on a service provider system that that provides network-accessible services; and caching a copy of the media content at the network edge server by the service provider in response to having received the request for the media content.

7. The method of claim 5, wherein determining the format associated with the device further comprises:

inspecting at least one of: hypertext transfer protocol (HTTP) headers of the request, a parameter of the request, or a uniform resource locator (URL) of the request; and determining a type of the device based further on information contained in the at least one of: the HTTP headers, the parameter or the URL of the request, wherein the type of the device is associated with the format suitable for rendering the media content on the device and one or more settings for transcoding the format.

8. The method of claim 5, wherein transcoding the media content further includes:

transcoding an initial portion of the media content into the format at a first bit rate and transcoding a remaining portion of the media content into the format at a second bit rate.

9. The method of claim 5, wherein the network edge server stores profiles for a plurality of device types, each profile indicating one or more formats for each of the plurality of device types supported by the network edge server.

10. The method of claim 5, wherein transcoding the media content further includes employing at least one graphics processing unit (GPU) to encode the at least a portion of the media content into the format while concurrently transmitting, to the device, bits of the media content that have been transcoded into the format suitable for rendering the media content on the device.

11. The method of claim 5, wherein transcoding the media content stored at the network edge server further includes:

transcoding the media content based at least in part on network conditions, the network conditions including at least one of: bandwidth, jitter, or number of packets lost.

12. A computing device, comprising:

a processor; and memory including instructions that, when executed by the processor, cause the computing device to:

receive a request for media content from a device, the media content being stored at a server located in a content delivery network (CDN) point-of-presence (POP);

detect a device type associated with the device based on the request, the device type having an encoding format associated with the device type;

transcode at least a portion of the media content stored at the server in the POP into the encoding format associated with the device type and apply a watermark to the media content while streaming, to the device, the at least a portion of the media content that have been transcoded into the encoding format associated with the device type, transcoding the at least a portion of the media content having access to one or more workflows, the one or more workflows including a first workflow for applying the watermark and a separate second workflow for at least one of providing multi-bitrate or adding audio to the media content; cause an access control to be applied to the media content based at least upon the watermark applied to the media content;

determine that the device has discontinued downloading the media content; and terminate the transcoding or downloading at the CDN POP.

13. The computing device of claim 12, wherein the device type is associated with one or more device attributes, the device attributes including at least one of: display capabilities, processing capacity, memory capacity, or operating system running on the device.

14. The computing device of claim 12, further comprising instructions that cause the computing device to:

enable a content publisher to upload the media content to a store on a service provider that that provides network-accessible services; and cache the media content at the server located at the POP in response to receiving the request for the media content.

15. The computing device of claim 12, wherein detecting the device type further comprises:

inspecting one or more hypertext transfer protocol (HTTP) headers of the request; and determining a type of the device based further on information in the one or more HTTP headers, wherein the type of the device is associated with the encoding format that can be used to render the media content on the device.

16. The computing device of claim 12, wherein transcoding the media content further comprises:

encoding an initial portion of the media content into the encoding format at a first bit rate and encoding a remaining portion of the media content into the encoding format at a second bit rate.

17. The computing device of claim 12, wherein the POP is provided with profiles for a plurality of device types, each profile indicating an encoding format for each of the plurality of device types supported by the POP.

18. The computing device of claim 12, wherein encoding the media content further includes employing at least one graphics processing unit (GPU) to encode the at least a portion of the media content into the encoding while concurrently transmitting, to the device, bits of the media content that have been transcoded into the encoding format.

19. A non-transitory computer readable storage medium storing one or more sequences of instructions executable by one or more processors to perform a set of steps comprising:

receiving, from a device, a request to download media content, the media content being stored at a network edge server;

determining an encoding format associated with the device based at least in part on information contained in the request;

transcoding at least a portion of the media content stored at the network edge server into the encoding format associated with the device and applying a watermark to the media content while concurrently transmitting, to the device, portions of the media content that have been encoded into the encoding format associated with the device, the transcoding having access to one or more workflows, the one or more workflows including a first workflow for applying the watermark and a separate second workflow for at least one of providing multi-bitrate or adding audio to the media content;

causing an access control to be applied to the media content based at least upon the watermark applied to the media content;

determining that the device has discontinued downloading the media content; and terminating the transcoding or downloading at the network edge server.

20. The non-transitory computer readable storage medium of claim 19, further comprising instructions for:

enabling a content publisher to upload the media content to a store on a service provider that that provides network-accessible services; and caching a copy of the media content at the network edge server by the service provider in response to having received the request.

21. The non-transitory computer readable storage medium of claim 19, wherein determining the encoding format associated with the device further comprises:

inspecting one or more hypertext transfer protocol (HTTP) headers of the request; and determining a type of the device based on information in the one or more HTTP headers, wherein the type of the device is associated with the encoding format that can be used to render the media content on the device.

22. The non-transitory computer readable storage medium of claim 19, wherein transcoding the media content further comprises:

encoding an initial portion of the media content into the encoding format at a first bit rate and encoding a remaining portion of the media content into the encoding format at a second bit rate.

* * * * *